United States Patent [19] [11] 3,729,704
Farr [45] Apr. 24, 1973

[54] EARTH HOLOGRAPHY WITH SPECIAL REFERENCE WAVE

[75] Inventor: John B. Farr, Tulsa, Okla.
[73] Assignee: Amoco Production Company, Tulsa, Okla.
[22] Filed: July 2, 1971
[21] Appl. No.: 159,383

[52] U.S. Cl. ...................................340/15.5 DS 340/15.5 CP, 15.5 H; 73/67.5 H
[51] Int. Cl. .............................................G01v 1/34
[58] Field of Search ................340/5 H, 5 I, 15.5 UD, 340/15.5 DS, 15.5 CP; 181/.5; 350/3.5; 73/67.5 H

[56] References Cited
UNITED STATES PATENTS

| 3,450,225 | 6/1969 | Silverman | 340/15.5 DS |
| 3,580,655 | 5/1971 | Leith et al. | 350/3.5 |

Primary Examiner—Benjamin A. Borchelt
Assistant Examiner—N. Moskowitz
Attorney—Paul F. Hawley

[57] ABSTRACT

In earth holography the reference wave is produced by generating a low amplitude cyclic vibration essentially at the earth's surface and receiving this under steady-state conditions at the various geophones in the seismic spread. The resultant signal is recorded and its square wave fundamental component used in determining the reference wave employed in making the ultimate hologram.

6 Claims, 2 Drawing Figures

Patented April 24, 1973 3,729,704

JOHN B. FARR
INVENTOR.

BY Paul F Hawley

ATTORNEY

EARTH HOLOGRAPHY WITH SPECIAL REFERENCE WAVE

BACKGROUND OF THE INVENTION

1. Field of the Invention

The use of steady-state waves diffracted from an object combined with a higher amplitude reference signal of the same frequency frequency produces a record which gives the three-dimensional aspect of the object. This forms the basis of holography, on either an optical or equivalent basis. Historically, this followed the work of Dennis Gabor (see "A New Microscope Principle," Nature, Vol. 161, p. 777, (1948).

2. Description of the Prior Art

The use of laser technology to perform three-dimensional photography with coherent (single frequency) optical waves followed in the early 1960's as shown, for example, in the article by Leith and Upatnieks "Reconstructed Wavefronts and Communication Theory," Journal of the Optical Society of America, Vol. 52, p. 1123 (1962) and, by the same authors, "Wavefront Reconstruction with Diffused Illumination and Three-Dimensional Objects," Journal of the Optical Society of America, Vol. 54, p. 1295, (1964). See also the Leith and Upatnieks U.S. Pat. No. 3,506,327. Holography has been well reviewed in Chapter 8 of the text Introduction to Fourier Optics by Joseph Goodwin, McGraw-Hill Book Co., New York (1968), as well as in other texts and articles.

Application of this technique for the determination of the orientation and shape of subsurface reflecting or refracting objects was covered by the Silverman Pat. U.S. Pat. No. 3,400,363, Seismic Holography. This taught generation of steady-state single-frequency sinusoidal seismic waves at an earth source, reception of reflected and refracted waves at a geophone spread, combination of the electric signals generated in the geophones with an alternating current wave of the same frequency, and the generation of a hologram having the amplitude and phase relationships at each hologram point corresponding to those from the combined signals at the equivalently located geophone. This hologram could then be inspected under wavefront reconstruction conditions to determine the shape of the various subsurface reflecting and refracting bodies.

Since the instant invention relates to special means for obtaining the reference beam, three patents should be considered, which, as far as I know, are all that refer to this situation. Ordinarily in optical holography, of course, the reference beam is simply a part of the coherent light from the laser source which passes along a fixed path to the camera where the hologram is prepared. The Cathey Pat. U.S. Pat. No. 3,415,587 teaches providing the reference beam from the part of the electromagnetic waves reflected from the object. This part is focused through a pin-hole aperture from which the diverging light is then directed to the photographic plate. The Rosen Pat. U.S. Pat. No. 3,540,790 employs coherent light from a laser scattered from one part of the object as the reference beam, but requires special positioning of the source relative to the object and the recording medium. It is not apparent how one would secure the equivalent of either of these arrangements in earth holography, to which my invention is directed.

Lastly, the Silverman Pat. U.S. Pat. No. 3,540,225 employs in earth holography the summation of all of the signals it received as the reference trace. This, as will be seen later, is quite different from the arrangement I employ, which deliberately makes use of the signals travelling along one particular path as the main source of the reference beam, with little or no use of most of the other seismic information reaching the geophone spread.

SUMMARY OF THE INVENTION

Data for use in producing holograms of the earth are made by placing a spread of geophones on or adjacent the earth's surface and exciting this surface at a point remote from the spread of geophones with essentially sinusoidal seismic waves. Earth holography requires reception at the geophones of cyclic seismic waves scattered or reflected back from the various subsurface strata and collected at each geophone, as well as use of a reference signal which serves as a determinator at each geophone of the phase of the received seismic waves relative to that of the reference wave. While ordinarily an external electrical reference sine wave has been employed, I employ a reference signal passing through the earth. This is produced by vibrating the earth's surface at a low amplitude compared with that employed in preparing the customary record of reflected and scattered waves. The received wave in this case is essentially composed in most circumstances of the refracted waves reaching the geophones from the first high-speed bed below the weathered layer. This is separately recorded and employed in the ultimate preparation of the earth hologram as the reference signal. In addition to the waves refracted from the high-speed bed below the weathered layer, waves also reach the geophones along paths along the surface. These are called surface waves. Such waves also contribute to the geophone response to the low amplitude vibration. In those cases where there is very little weathering these surface waves are the major contribution to the reference signal. Such is true for solid rock at the surface, or in case of marsh, or the like. Alternatively, either using a computer or optical means, this refracted reference signal, plus surface wave contribution, is removed and a desired flat or spherical reference substituted in its place. This corrects for the unknown irregularities or distortions introduced by the upper low speed (weathering) layer.

BRIEF DESCRIPTION OF THE DRAWING

The attached drawings form a part of the specification and are to be read in conjunction therewith. In the drawings.

DESCRIPTION OF THE PREFERRED EMBODIMENT

Figure 1:
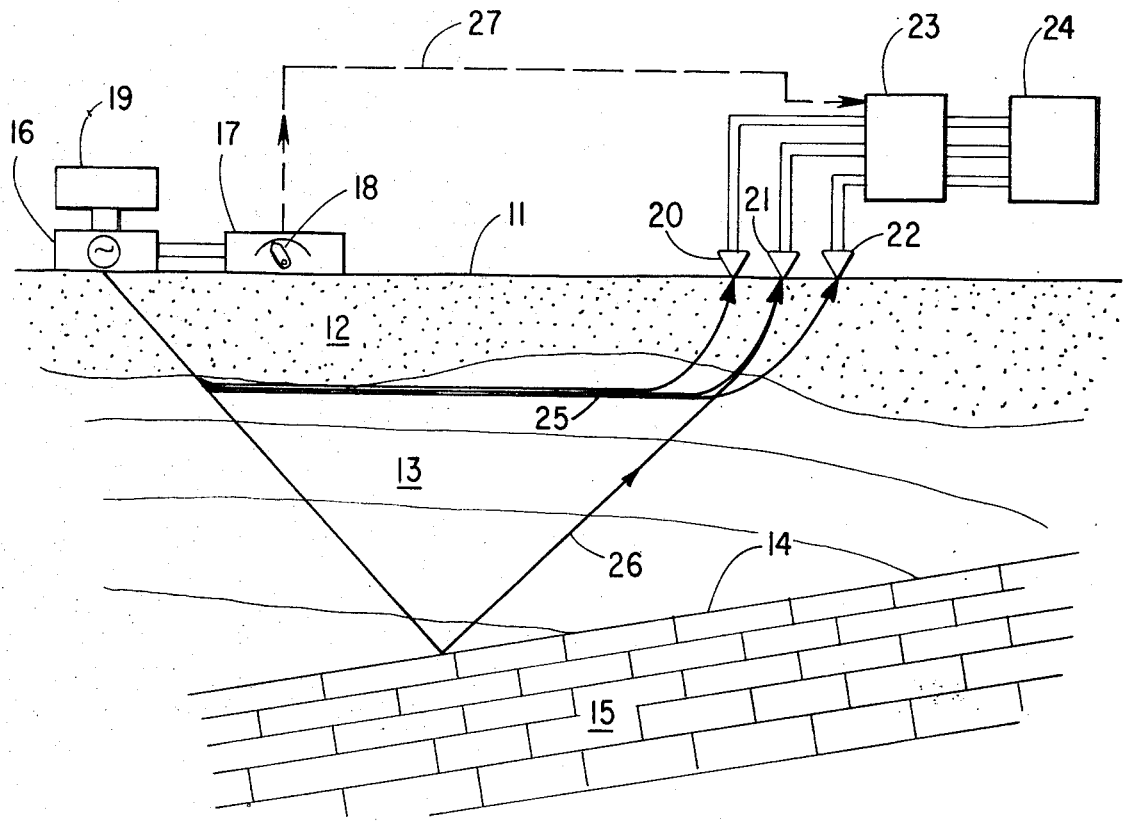
FIG. 1 illustrates diagrammatically a cross section of a layered earth showing a geophone spread and a shaker capable of producing essentially sinusoidal seismic waves penetrating the earth, together with the ray paths defining certain paths of seismic energy between source and receiver.

In seismic exploration using the holographic process it is necessary to produce by optical or computer techniques a hologram, or its equivalent, which can be viewed in coherent light to show the subsurface formations in three-dimensional aspect. In order to accomplish this, it is necessary to produce the hologram, that is, to produce a record in which at each point there is recorded the signal due to all subsurface arrivals reflected and/or refracted to the receiving geophone from the normal amplitude seismic signal produced at the source, suitably combined with a reference signal which varies in both amplitude and phase in a completely predictable manner from point to point areally across the hologram. This reference wave need not necessarily change in amplitude or phase in one particular fashion. However, for simplicity in reconstructing the three-dimensional image, either real or virtual, or any contour mapping equivalent to such three-dimensional image, it is absolutely necessary that the reference trace be present. It is desirable that it be employed at the location of each geophone as if a reference seismic signal in the earth were coming from a point source at some point within the earth, thus producing spherical wave fronts at the geophone spread.

My improvement on the overall process lies in the way the reference trace is produced. In the past such trace has been produced by electrically conducting from the source to the various geophones an electric signal synchronized with the motion of the shaker which is operating under steady-state condition. This electric reference signal is then combined with the signal received by the geophone, which includes all of the refracted reflected and scattered waves received from within the earth.

Rather than use such an arrangement which involves forming a communication path between the seismic source (seismic earth shaker) and each geophone, such as a telephone line or radio link, I prefer to rely on communication paths inherently present between the source and each geophone, namely, the refraction and surface wave paths. The refraction path extends from the source through the weathered layer to the first high-speed layer below, along it to the weathered zone below the geophone, and up to the geophone. The surface wave path extends from source to geophone about on the surface of the earth. In order to employ such paths, I first determine the shaker amplitude which I choose to employ under steady-state condition for generating the signals containing all subsurface information. In making such determination I ordinarily operate the shaker at or near the upper end of its amplitude capability so as to obtain information from as deep reflecting beds as possible. I then reduce the amplitude of the seismic source to as low an amplitude as possible that will produce a readable output record in view of the seismic noise inherently always present. The reduction will always be at least by a factor of 10 and preferably by a factor of at least 50 to 100. A second record is then made.

This second record is the record from which the reference wave information is obtained. It is made up over 99 percent under ordinary circumstances of waves travelling the minimum time refracted path from source to receiver. It also includes the surface wave contribution to the geophone output. The phase of such wave is therefore determined essentially by the vector sum of the waves along the surface path and along the refraction path between the source and the various geophones or geophone groups, if plural geophones are connected to give a single output. While the amplitude of the received wave is deliberately kept low, after reception at the geophones this amplitude is increased by operating the electric amplifiers connected to the geophones at a correspondingly greater amplification level so that the amplitude of the wave when used for holographic purposes is several times larger than the amplitude of the wave used in making the original steady-state sine wave earth investigation, for example 3 to 10 times this amplitude. This is due to the fact, as is well known in making holograms, that the reference wave amplitude preferably is several times that of the signals from the object — in this case the signals from the various subsurface formations.

Preferably I employ digital techniques at this point or at the next point in the process. This digital process involves the use of an analog-to-digital converter. The output of this converter is manipulated in a fashion well known to those skilled in this art to select only the single digitized component which is the largest. All other parts of the data are discarded. This digitized information, then, forms a nonlinear response to the original sinusoidal seismic source, but which contains the essential amplitude and phase information in the form of a square wave. This is perfectly competent to convey the necessary information in a reference wave.

In view of the background art already discussed, it is not believed necessary to go into the matter of reconstruction from the hologram. Therefore, the rest of this description refers to the operations at each point on the earth where holographic information is desired.

In FIG. 1 a cross section of the earth is shown from the surface 11 downward through the weathered layer 12 to the first competent rock zone 13 which has an interface 14 with a second stratum 15, below which will ordinarily lie a plurality of other strata. A shaker 16 has been set up at the surface of the earth for operation at a desired single frequency and at least approximately constant amplitude and sinusoidal wave form generated by the electrical source shown diagrammatically at 17. This has an adjustable amplitude control 18. The shaker includes an upper mass 19 (which may be a truck body or the like) sufficiently great to keep the shaker 16 in contact with the earth's surface 11 at all points during the cycle.

Removed from the shaker 16 is a spread of geophones shown in greatly reduced number (for simplicity) as geophones 20–22, suitably connected to an adjustable gain multichannel amplifier 23 and a multitrace recorder 24. I prefer to use a reproducible recorder for this unit, such as a multichannel magnetic tape recorder, or the like.

In operation the shaker 16 is operated under steady-state sinusoidal conditions to produce two separate and distinct records at two separate and distinct amplitudes. One, the so-called main record, involves operating the shaker at what is commonly called normal amplitude, i.e., an amplitude which has been found by experience or experiment to be sufficient so that information of significant amplitude is received by the geophones from the deepest seismic reflectors of interest. This means that the geophones 20–22 of the seismic spread are responding simultaneously to sinusoidal seismic waves travelling paths generally indicated at 25, the refraction paths, and also reflected and/or diffracted seismic paths, such as path 26. If a hologram is prepared from the data recorded by recorder 24 under these circumstances, in combination with a suitable reference wave, it is immediately possible to obtain a three-dimensional holographic presentation, for example, as discussed in the Silverman U.S. Pat. No. 3,400,363 referred to above. Until my invention was made, such reference trace was made by diverting an electric signal from the electrical source 17 along a communication path 27 to still another channel in the multichannel amplifier 23 and multichannel recorder 24. Then, when the hologram was prepared the reference trace was incorporated in its original amplitude and phase with each of the traces resulting from the response of the geophones 20–22 along the spread.

Now, however, my invention employs the use of a second record made without communication path 27 and with a low amplitude of input signal from shaker 16. Preferably this amplitude is not more than one-tenth of that used in making the first recording and as little as one-fiftieth to one one-hundredth such amplitude can be satisfactorily used. In this case, while seismic energy is still passing along the reflected and/or scattered paths, such as path 26, nearly all and certainly over 98 percent of the energy is arriving at the geophones 20–22 via the refraction paths 25 and along the surface path at surface 11. Paths 11 and 26 are called, for simplicity, direct paths. It appears on the multichannel recorder 24 as a wave propagating across the spread via an essentially horizontal path, generally in the direction from the actual source 16, but not necessarily coincident with it.

In preparing this second record I ordinarily operate the adjustable gain of the multichannel amplifier 23 at a considerably higher level which will more than compensate for the reduction in the shaker 16 amplitude. However, if desired, low level recordings may be employed.

In the subsequent processing, each record trace of the low shaker amplitude recording from a geophone (or geophone group) is individually passed through an analog-to-digital converter programmed to ignore all but the first significant bit of information. If this data were then plotted optically or by computer on a two-dimensional holographic plate, it would form a background or reference trace. Superposition of the field record due to the high amplitude signal from shaker 16 before such plotting would produce a suitable hologram which then can be viewed as any other hologram to produce a three-dimensional subsurface representation of the seismically reflecting beds, or combined by computer analysis to produce contour maps of the various reflecting horizons. The amplitude of the reference trace, it must be remembered as employed must be several times as great as the maximum amplitude from the recording made at normal shaker amplitude in the field.

Figure 2:
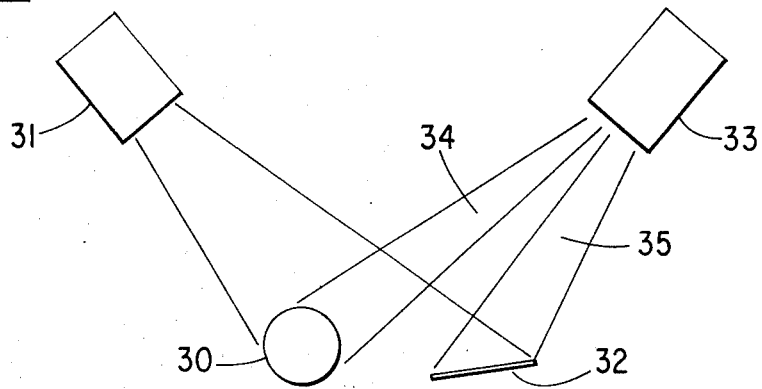
FIG. 2 shows in very simple diagram form one arrangement of producing optically a hologram, including the recording from the object and the placement on this hologram of a beam from the reference source.

In terms of optical analog, this is rather like the arrangement shown in FIG. 2 employed in optical holography to produce a hologram of an object 30. To make the hologram, a laser 31 or other source of coherent light is used to illuminate the object 30 and simultaneously illuminate a mirror 32. The optical rays from both the object 30 and from the reference mirror 32 enter the camera 33 where a hologram is photographically reproduced, the amplitudes from the waves 34 reflected from the object 30 being combined in amplitude and phase with the waves 35 from the reference mirror. It is to be noted that the arrangement shown is one which has been used in practice. It has the property, as does the arrangement shown in FIG. 1, of having the reference waves out of phase across the face of the holographic plate. By this is meant that such hologram does not have a reference wave which is a plane wave with essentially zero phase difference extending across the face of the plate, but a considerable phase difference from one extent to the other. Such arrangement does not alter the utility of the resultant hologram. Similarly, in the arrangement shown in FIG. 1, the refracted and surface waves reaching geophone 20 produces a reference wave which is out of phase, i.e., leads, the same reference wave arriving at geophone 21 or 22, and so on.

If desired, the operator may set up an entirely synthetic reference wave in the form of a plane wave or a spherical reference wave, such as is commonly employed in optical holography, by use of a computer program which generates such a wave in proper amplitude and phase, substituting this for the refracted reference wave, but directly related timewise to the phase of the signal received, for example at geophone 20.

As mentioned above, the square wave part of the response of the geophones to the low amplitude shaker operation may be used in a properly programmed computer to remove the reference wave due to this square wave and substitute another reference wave — for example, a reference wave of virtual source vertically below the geophone spread, for example.

One way to do this, for example, is to program the computer in terms of the areal position of each geophone group, to subtract from the input data a sine wave the amplitude of which is directly proportional to that of the square wave component at this group position, and the phase of which is directly timed to coincide with the crossing of the zero axis of this square wave. Second, the computer is then programmed to add to the result of this subtraction the amplitude of a reference wave at a phase corresponding to a point source vertically below the center of the geophone spread and at a convenient distance below. Ordinarily it is convenient to use a plane wave, corresponding to a great (theoretically infinite) distance below the spread.

The input data from the response of the geophone groups to the normal amplitude vibration is now fed into the programmed computer. The output, for each geophone group, is the amplitude and phase of the signal used to construct the hologram, at the corresponding areal point of the hologram.

Use of the refraction waves as the reference waves has many inherent advantages. It is, for example, the first event to arrive, hence is available for all later reflections if time-sequence holography is used. Second, it has high amplitude with respect to all of the reflected waves received at a geophone, which means that the use of such signal can involve proper amplitude relation in making the hologram compared to the normal trace. Third, it automatically corrects for weathering changes, i.e., changes in thickness of the weathered layer 12 below each geophone which would otherwise adversely affect reconstruction of a subsurface feature. Further, it simplifies recording of the field recording apparatus for eliminating the need for a constant frequency clock and associated communication path 27 between source and geophones. The second and fourth advantages are also true if surface reference waves are used.

If desired, the reference wave may contain not only the refracted and surface waves but it may also contain some shallow reflector data, in which case these are all automatically incorporated into the reference trace and are not seen in the reconstructed image. By changing the power level in the reference wave construction, deeper and deeper reflector information can be included in the reference wave and thereby excluded from the reconstruction of the subsurface by the hologram. This permits holography of very deep, very low energy reflecting structural interfaces.

In marine seismic surveying operations using the holography technique, there is no weathered layer but the direct arrival waves serve as the full equivalent and are therefore used as the reference trace.

Waves other than the refracted arrival could also be used as a reference, the only requirement being that they are defined. Surface waves, as have already been mentioned, and air waves are distinct possibilities, but due to their slow velocity, restrict the system to steady-state rather than time gating. However, air microphones or three-dimensional surface geophones more responsive to airborne, Rayleigh and Love-type waves can discriminate quite easily between the reference and subsurface arrivals. Using waves which are defined by mechanical receiving methods has the advantage that only a single vibration is required rather than the two vibrations at high and low power in the refraction reference method. However, no automatic weathering correction is obtained.

I claim:

1. In the process of seismic earth holography in which a steady-state at least approximately sinusoidal, constant amplitude, single frequency first vibration is applied at least adjacent the surface of the earth and seismic waves refracted and reflected from subsurface earth formations are received at a spread of geophones and the geophone signals amplified so that the relative amplitudes and phases of the signals produced by the various geophones in the spread can be ascertained, the method steps comprising
   1. generating at the same location as said first vibration a second at least approximately sinusoidal steady-state vibration at said single frequency but at an amplitude small compared with that of said first vibration,
   2. receiving seismic waves traveling along at least one direct path at the geophone locations of said spread to produce geophone output signals,
   3. amplifying said geophone output signals due to said second vibration to an amplitude substantially greater than that of any of said geophone signals due to said first vibration, and
   4. combining at locations corresponding to those of said geophones the amplified geophone signals due to said first vibration with those from step 3) in a hologram, from which the relative positions of said subsurface earth formations can be found.

2. A process according to claim 1 in which said second vibration is of an amplitude in the range of 0.1 to about 0.02 or less of that of said first vibration.

3. In the process of seismic earth holography in which a steady-state at least approximately sinusoidal, constant amplitude, single frequency first vibration is applied at least adjacent the surface of the earth and seismic waves refracted and reflected from subsurface earth formations are received at a spread of geophones and the geophone signals amplified so that the relative amplitudes and phases of the signals produced by the various geophones in the spread can be ascertained, the method steps comprising
   1. generating at the same location as said first vibration a second at least approximately sinusoidal steady-state vibration at said single frequency but at an amplitude small compared with that of said first vibration,
   2. receiving seismic waves refracted along the path below the weathered layer at the geophone locations of said spread to produce geophone output signals,
   3. amplifying said geophone output signals due to said second vibration to an amplitude substantially greater than that of any of said geophone signals due to said first vibration, and
   4. combining at locations corresponding to those of said geophones the amplified geophone signals due to said first vibration with those from step 3) in a hologram, from which the relative positions of said subsurface earth formations can be found.

4. In the process of seismic earth holography in which a steady-state at least approximately sinusoidal, constant amplitude, single frequency first vibration is applied at least adjacent the surface of the earth and seismic waves refracted and reflected from subsurface earth formations are received at a spread of geophones and the geophone signals amplified so that the relative amplitudes and phases of the signals produced by the various geophones in the spread can be ascertained, the method steps comprising
   1. generating at the same location as said first vibration a second at least approximately sinusoidal steady-state vibration at said single frequency but at an amplitude small compared with that of said first vibration,
   2. receiving seismic waves traveling along the surface of the earth from the point of generation of said second vibration at the geophone locations of said spread to produce geophone output signals,
   3. amplifying said geophone output signals due to said second vibration to an amplitude substantially greater than that of any of said geophone signals due to said first vibration, and
   4. combining at locations corresponding to those of said geophones the amplified geophone signals due to said first vibration with those from step 3) in a hologram, from which the relative positions of said subsurface earth formations can be found.

5. In the process of seismic earth holography in which a steady-state at least approximately sinusoidal first vibration of constant amplitude and single frequency is applied at least adjacent the surface of the earth and seismic waves refracted and reflected from subsurface earth formations are received at a spread of geophones and the geophone signals amplified so that the relative amplitudes and phases of the signals produced by the various geophones in the spread can be ascertained, the method steps comprising 1. generating at the same location as said first vibration a second at least approximately sinusoidal steady-state vibration at said single frequency but at an amplitude small compared with that of said first vibration,
2. receiving at least seismic waves refracted along the path below the weathered layer at the geophone locations of said spread to produce geophone output signals,
3. amplifying each said geophone output signals due to said second vibration to an amplitude substantially greater than that of any of said geophone signals due to said first vibration,
4. passing each amplified geophone output individually through an analog-to-digital converter,
5. selecting only the single largest digitized component of said output, to form a square wave of fundamental frequency equal to that of said first vibration, and
6. combining at locations corresponding to those of each of said geophones the amplified geophone signals due to said first vibration with the square wave of step 5) with the amplitude of said square wave considerably exceeding the maximum amplitude of said amplified geophone signals in a hologram, from which the relative positions of said subsurface earth formations can be found.

6. A process according to claim 5 in which said second vibration is of an amplitude in the range of 0.1 to about 0.02 or less of that of said first vibration.

* * * * *